Aug. 29, 1961 V. R. SPERTI 2,997,789
SHEARS
Filed March 31, 1961 4 Sheets-Sheet 1

VINCENT R. SPERTI
INVENTOR

BY Walter G. Finch
ATTORNEY

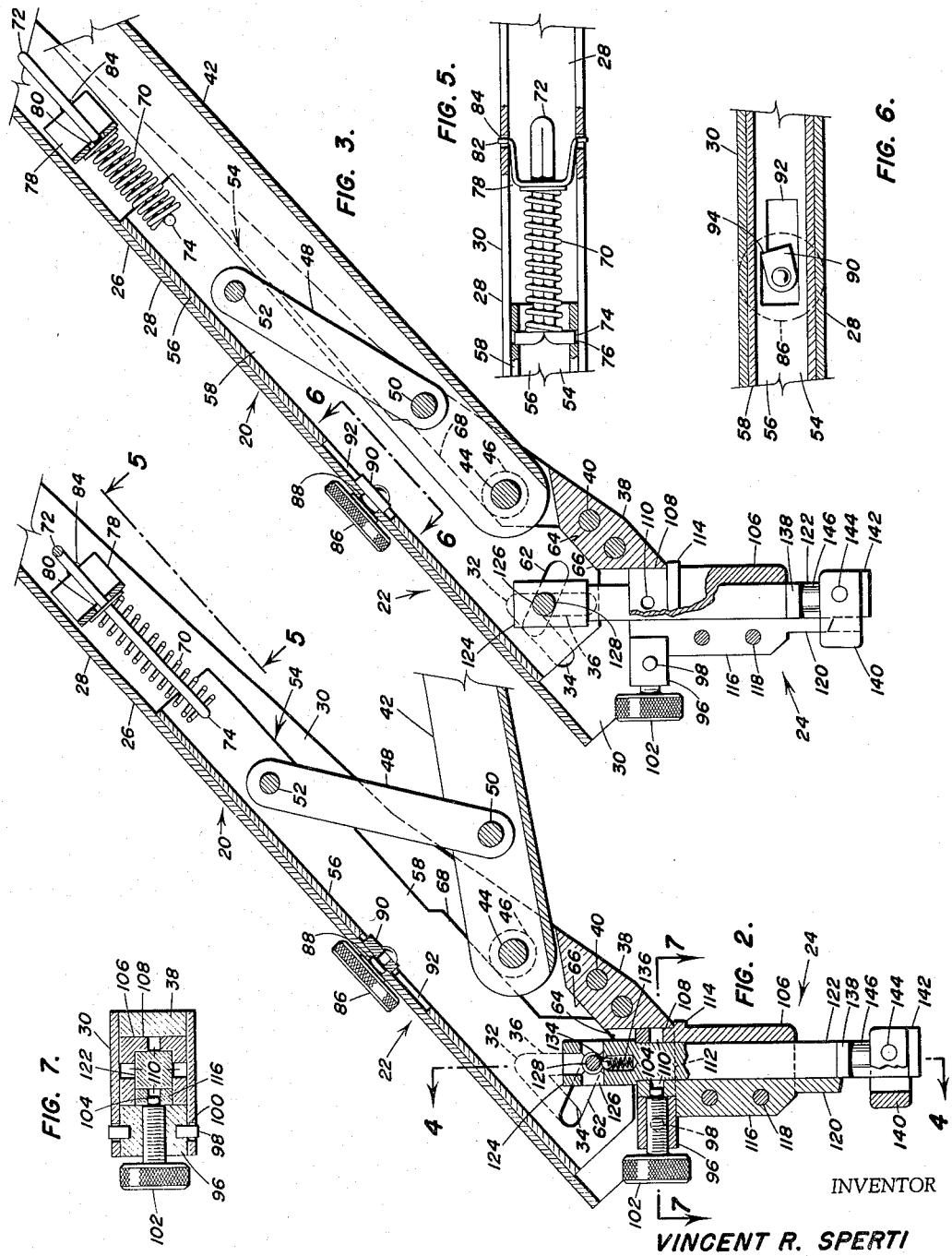

Aug. 29, 1961  V. R. SPERTI  2,997,789
SHEARS
Filed March 31, 1961  4 Sheets-Sheet 3
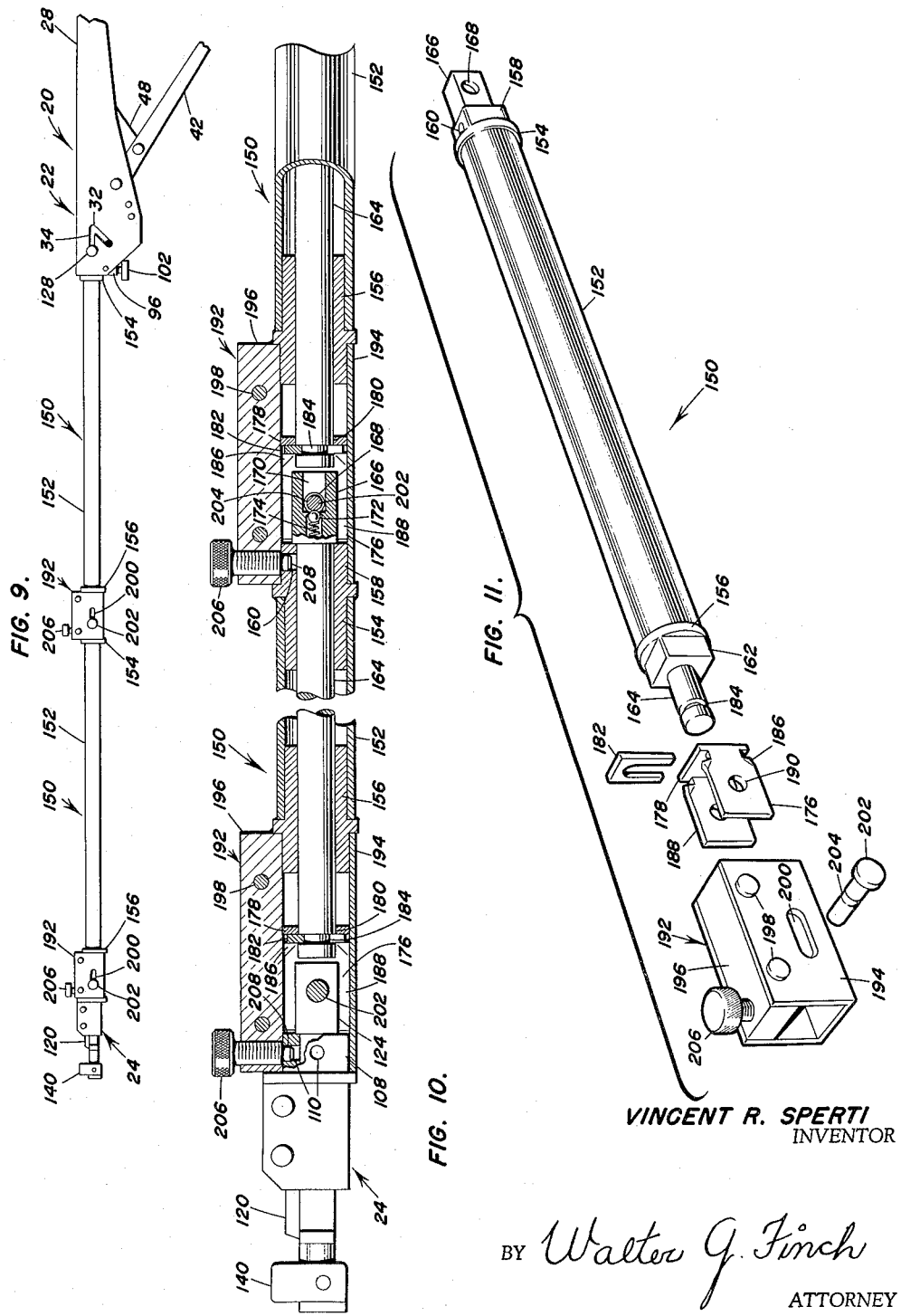
VINCENT R. SPERTI
INVENTOR
BY Walter G. Finch
ATTORNEY

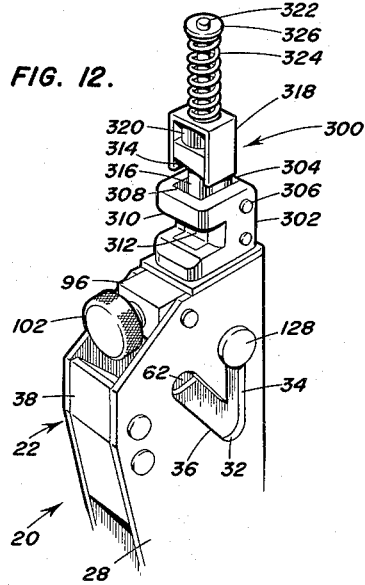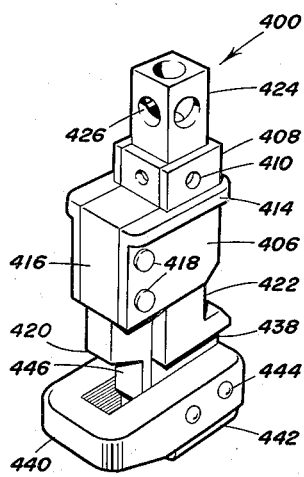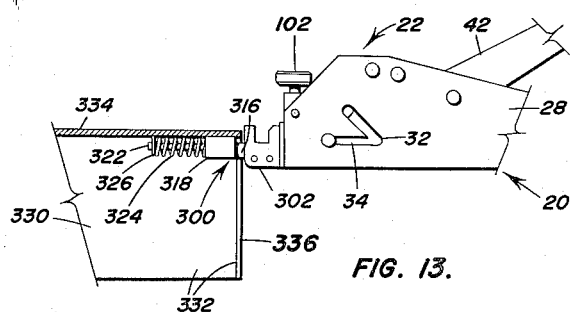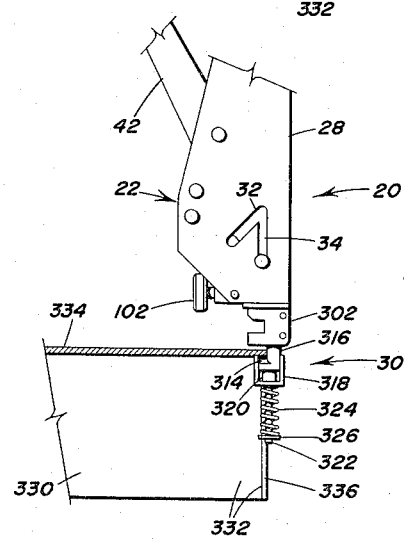

United States Patent Office 2,997,789
Patented Aug. 29, 1961

2,997,789
SHEARS
Vincent R. Sperti, Baltimore, Md.
(3718 Valley Hill Drive, Randallstown, Md.)
Filed Mar. 31, 1961, Ser. No. 99,740
12 Claims. (Cl. 30—242)

This invention relates to metal cutting tools, and more particularly to manually operated shears for cutting sheet materials of metal and the like.

In the past among the many varied industries whose work entailed the use of sheet metals in the fabrication or repair of limited production items, considerable difficulty has been experienced in cutting. In making any cut, other than a full straight cut across an entire sheet, the mechanic has always had to resort to tools of limited use, the quality of whose work almost always required additional finishing.

Aircraft shears and tin snips, two very commonly used tools, have always proved less than satisfactory in that it is virtually impossible to make even the very shortest cut across a sheet of material without distorting the material.

Burning of the material is also objectional because the cut edge almost always requires additional clean-up and extreme care must be exercised to avoid warpage. This method is useless when it is imperative to avoid altering the properties of the metal in the vicinity of the cut.

For those engaged in the erection of limited numbers of custom chassis for the electronics industry, it is necessary to provide apertures in sheet metal panels into which are installed various instruments. Where the size of the aperture exceeds the size of a standard punch, the usual practice has been to drill a series of adjoining holes within the confines of the area to be removed. This method leaves a scalloped edge requiring considerable additional clean-up of the material with a file.

In the aircraft and automobile body repair industries, it has been extremely difficult to make cuts in a panel to which access could be gained only through a lightening hole in an adjacent panel. As often as not the obstructing panel had to be removed.

It is, therefore, an object of the present invention to provide a tool for manually cutting sheet materials, the use of which will not occasion any distortion to the material on either side of the cut.

It is a further object of this invention to provide a tool capable of making cuts of a complex pattern upon completion of which no additional dressing or clean-up shall be required.

A still further object of the present invention is to provide a tool which is capable of producing cuts through materials to which access can not be gained with the use of other cutting implements.

Another object of this invention is to provide a shears device which can be effectively used to perform cutting operations of materials with greater ease and which has greater versatility over prior known cutting devices, such as snips.

Still another object of this invention is to provide a shears device which can be used to cut metallic materials of greater thickness than previously accomplished by conventional tools.

And still another object of this invention is to provide a unique shears device which can be effectively used to cut brittle materials, including plastic type materials.

Still even another object of this invention is to provide a shears device which can travel over surfaces which are flat, curved (such as a metal tube), corners (such as angle iron), or corrugated panels and cut through the surface thereof.

To provide a unique shears device which has a cutting head which can be adjusted to a plurality of different positions quickly and effectively, is still another object of this invention.

Another object of this invention is to provide a shears device which can accept any one of a plurality of cutting heads to perform any one of a plurality of operations, including punching round or square holes of different sizes; removing or replacing rollover rivets; installing of eyelets; resetting of saw teeth; as well as to provide a hole cutter for leather or similar material; to operate tweezers by remote control, and to remove and replace retainer lock rings, to mention only a few applications.

Still another object of this invention is to provide a shears device which is economical to manufacture, efficient and reliable in operational use, and which is easy to assemble, diassemble, maintain and operate.

These and other objects and attendant advantages of this invention will become better understood from the following detailed specification and accompanying drawings in which:

FIG. 2 is a fragmentary longitudinal section, taken along line 2—2 of FIG. 1, illustrating the relationships of the various elements of the shears device as they appear when in one extreme position of their movement;

FIG. 3 is a longitudinal section similar to FIG. 2 but with the various elements of the shears device shown as being moved to the opposite extreme position;

FIG. 5 is a fragmentary elevational view, taken along line 5—5 of FIG. 2, with certain elements shown as broken away;

FIG. 6 is a fragmentary cross section taken along line 6—6 of FIG. 3;

FIG. 7 is a horizontal cross section taken along line 7—7 of FIG. 2;

FIG. 9 is an elevation, on a greatly reduced scale, illustrating an extension accessory, connected in series, for use with the shears device;

FIG. 10 is an axial section, on an enlarged scale, through the extension accessory shown on FIG. 9, with certain of the elements shown in elevation, portions thereof having been broken away;

FIG. 11 is an exploded perspective view of the extension accessory depicted in FIGS. 9 and 10;

FIG. 12 is a perspective view illustrating a modified form of a cutter assembly of the shears device;

FIGS. 13 and 14 together illustrate the manner of using the cutter assembly shown in FIG. 12; and FIG. 15 is a perspective view of a further modification of the shears device.

Figure 1:
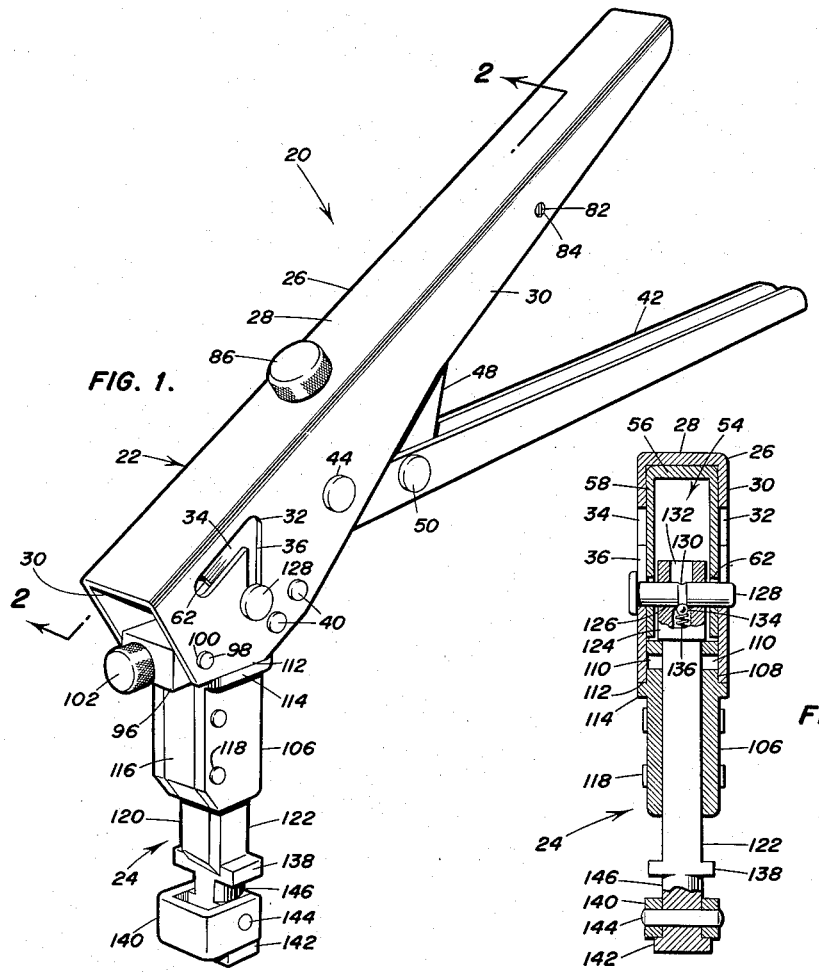
FIG. 1 is a perspective view of a shears device incorporating features of this invention.

Referring now to FIGS. 1, 2 and 3 of the drawings, there is shown generally by reference numeral 20 a manually actuated shears device which consists generally of an upper actuating assembly 22, which supports and actuates a cutter assembly 24, and a handle 42 for driving the cutter assembly 24.

The upper actuating assembly 22 consists of a channel shaped member 26 formed with a web 28 and a pair of sides 30. Each side 30 is provided with a V-shaped slot 32, one leg 34 of which runs parallel to the web 28 with the other leg 36 being arranged at an angle of approximately 60° with respect to the web 28. However, any desired design angle can be used. In addition, the slots 34 and 36 do not have to connect together as long as their axial extensions will intersect in a common point.

Slidably arranged within channel 26 is a close fitting channel shaped slide member 54 which is formed with a web 56, that rides against web 28, and sides 58 which are provided, at their open edges near one end, with bearing surfaces 64 and 68.

Each side 58 is further provided, at one end, with a slot 62 arranged at such an angle so that its opposite ends will overlie the non-intersecting ends of legs 34 and 36 of slots 32 as best illustrated in FIG. 2.

Figure 8:
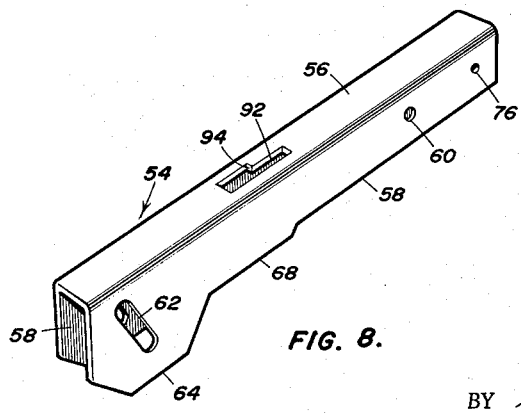
FIG. 8 is a perspective view of an important detail of the shears device illustrating its appearance when disassembled therefrom.

As most clearly shown in FIG. 8, the web 56 is provided with a somewhat L-shaped locking slot 92 and sides 58 are provided at their ends opposite those containing slot 62, with holes 60 and 76 whose function shall be described subsequently.

The sides 30 of channel 26 are bridged at their open edge near slots 32 by means of a block 38 whose inner surface 66 is arranged parallel to the web 28 so as to provide a bearing face for edges 64 of slide channel 54. The block 38 is secured by rivets 40.

The slide channel 54 is actuated, in reciprocating fashion, within channel 26 by the handle 42 to which it is connected through a link 48. The upper end of the link 48 is secured between the sides 58 of channel 54 by a pin 52, whose ends are received in holes 60 and the lower end is similarly secured between the sides of the handle 42 by a rivet 50.

The handle 42, whose width is slightly narrower than the distance between sides 58 of slide 54, is hinged between sides 30 of channel 26 by a pin 44. As illustrated only in FIGS. 2 and 3, the space around rivet 44 between the outer surface of each side of handle 42 and the adjacent inner surface of side 30 of channel 26 is occupied by a washer-like spacer 46, shown dotted, which functions as a roller for its respective bearing edge 68.

As shown in FIGS. 2, 3, and 5, actuating the handle 42 to a closed position will drive slide 54, against the bias of a spring 70, from the position shown in FIG. 2 to the position shown in FIG. 3. Release of the handle 42 will allow spring 70 to restore slide 54 to the position shown in FIG. 2. Spring 70 is positioned around a wire guide 72, one end of which passes through an aperture 80 in the web of a U-shaped clip 78. The side legs of clip 78 are each formed with a small tab 82 that resides in a hole 84 in each side 30 of channel 26. The opposite end of guide 72 is formed with a pair of opposed facing legs 74 which ride in the previously mentioned holes 76 in the sides of slide 54.

It should be noted at this point that the handle 42 can be locked, for storage purposes, in the position shown in FIG. 3 by means of a key 90 which is shown in FIGS. 2, 3 and 6. The key 90 is slidably received by the slot 92 which is formed with an evidenced portion at one end so as to provide a locking shoulder 94. The key 90 is riveted to the stub shaft of a knob 86 which rotates in a hole 88 in the web 28 of channel 26.

FIG. 6 illustrates a locked condition for slide 54. A short clockwise rotation of knob 86 will align key 90 with the narrower portion of slot 92 and permit spring 70 to restore slide 54 to the position shown in FIG. 2.

As best shown in FIGS. 2, 3, 4 and 7, the cutter assembly 24 comprises a guide block 106 whose cross section is generally U-shaped as viewed in FIG. 7, and whose open side is closed by a bar 116 which is secured in place by rivets 118. The upper end of the guide block 106 is fashioned in the form of a square boss 108 which has been cross-bored to provide locking holes 110.

The boss 108 is adapted for reception within a square aperture, two of whose opposing sides are formed by the walls 30 of channel 26, the forward side of which is formed by the rear surface of a swivelable locking block 96 and the rear side of which is formed by the forward surface of the guide block 38.

The locking block 96 is rotatably secured between side walls 30 by means of its short opposed pins 98 which reside in holes 100. The block 96 is provided with a threaded aperture which receives a thumbscrew 102, whose threaded shank has formed thereon a reduced diameter tongue 104. This tongue 104 is received by any one of the cross bores 110 to lock the cutter assembly 24 in place.

Passing through the guide block 106, is a square rod 122 whose lower end is formed with a flange 142 which supports a U-shaped female die 140. This die 140 is further secured to rod 122 by a pin 144. The die 140 is arranged to receive a punch 120, formed integrally with the closure bar 116 at its lower end, when the rod 122 is drawn up into the guide block 106 as will be described subsequently.

A somewhat enlarged head 124 of square cross-section is formed on the upper end of rod 122. The head 124 is pierced by cross-bores 126 through either one of which may be passed a pin 128 in order to couple the rod 122 to the slide channel 54.

Figure 4:
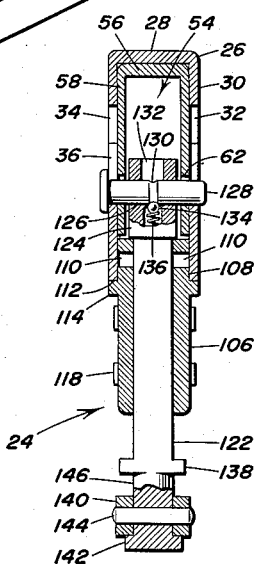
FIG. 4 is a vertical cross section taken along line 4—4 of FIG. 2.

As illustrated in FIGS. 2, 3, and 4, the ends of pin 128 are engaged in legs 36 of slot 32, and in slot 62 of slide 54. An examination of FIGS. 2 and 3 will show that as handle 42 is swung upwardly, slide 54 will be forced upwardly to the right thereby causing slot 62 to cam the pin 128 upwardly in slot leg 36 thereby raising rod 122 and causing punch 120 to enter the die 140.

During a shearing operation, the sides of the slot formed by punch 120 may tend to wedge themselves to the punch. For this reason, a flange 138 is formed on each side of rod 122 so that as the rod 122 moves downwardly after each punching operation, the flanges 138 will force the wedged sheet off the punch 120 and allow the rod 122 to advance in the slot being formed.

During a shearing operation, loads passing upwardly through punch 120 and guide 106 are resisted by edges 112 which bear against a flange 114 provided at the sides and rear of guide block 106.

It should be noted that a short cylindrical portion 146 is provided on rod 122 between flanges 138 and die 140 so as to allow the operator to make sharp angular turns in any direction at any position within the slot being cut.

It is a perfectly simple matter, using the shears device 10 of the present invention, to provide a sharp cornered square hole in the center of a sheet of material without any subsequent dressing of the corners. It is necessary only to drill a hole, anywhere within the outline of the desired square, just large enough to allow passage of die 140 after which cutting can proceed as described.

It will be further noted that the head 124 of rod 122 has an axial bore 132, the lower end of which carried a detent ball 134 biased upwardly by a spring 136. The ball 134 engages a groove 130 in pin 128, thereby preventing its inadvertent removal. During the absence of the pin 128, the ball 134 will be retained in conventional fashion by staking the metal around the edge of the bore in which it is contained. Most ordinary cutting operations will be performed with the cutter assembly 24 installed as shown in FIGS. 1, 2 and 3.

However, special problems of clearance of accessibility will on occasion make it desirable to face the cutter assembly 24 90° to either side or 180° to the rear of the position illustrated. This will be very simply and quickly accomplished by backing off thumbscrew 102 enough to withdraw tongue 104 from hole 110 and by pressing or tapping out pin 128.

The cutter assembly 24 can then be removed and turned 90° or 180° and then reinstalled. Pin 128 can then be replaced in one of the cross-bores 126 and tongue 104 restored to one of the cross-bores 110.

Still further rearrangement of the cutter assembly 24 is possible in order to obviate a difficult problem encountered when cutting across a corrugated sheet. With the cutter assembly 24 installed as shown in FIG. 2 it might prove difficult, and in some cases impossible, to cut across corrugated sheeting for as the tool progresses from a valley upwardly towards a peak, the actuating handles will naturally rock back and downwardly, thereby restricting the movement of handle 42.

This difficulty is readily sidestepped by removing the cutter assembly 24 as described above and by reaffixing it to the actuating assembly so that the axis of the rod 122 is in line with the leg 34 of slot 32. After removing the cutter assembly 24, it is necessary only to rotate block 96 counterclockwise, as viewed in FIG. 2, until the axis of thumbscrew 102 is perpendicular to web 26.

Boss 108 can now be installed in the square aperture, the two sides of which are formed by the forwardmost edge of sides 30 of channel 26, the forward edge of which is formed by the forward edge of web 28 and the rear edge of which is formed by block 96. Reciprocation of slide 54 will now cause slot 62 to work the pin 128 back and forth in leg 34 of slot 32.

Because the shears device 20 is now held vertically while cutting a slot, more than sufficient clearance becomes available for rocking the shears device 20 back and forth while progressing across a corrugated sheet.

Although a modified cutting assembly is shown, FIG. 12 clearly illustrates the position of the block 96 when leg 34 of slot 32 is being used.

FIGS. 9, 10 and 11 disclose an extension assembly 150 which enables the user of the present invention to make cuts through panels which ordinarily would be totally inaccessible to other cutting implements.

One end of the extension assembly 150 is adapted, by means of a square boss 158, for coupling with the actuating assembly 22. The opposite end of extension 150 is arranged to receive either the square boss 108 of a cutter assembly 24 or the boss 158 of a second extension 150. Thus, as shown in FIGS. 9 and 10, several extension rod assemblies may be coupled together in series.

The extension 150 comprises a cylindrical sleeve 152 into each end of which are welded on a pair of hollow thimbles 154 and 156. One end of a rod 164, which passes through the sleeve and thimble assembly, has formed thereon a head 166 of square cross-section. Head 166 duplicated the functions and details of head 124 of cutter assembly 24 in that it is provided with a cross-bore 168 which receives either pin 128 for coupling to the actuator assembly 22, or a similar pin 202 for coupling with a second extension 150.

Pins 128 or 202 are secured against inadvertent removal by the detent ball 172 which engages either the slot 130 of pin 128 or the slot 204 of pin 202. Ball 172 is biased against the slot of either pin by a spring 174 which resides in axial bore 170. Square boss 158 is provided on one of its faces, with a locking hole 160 enabling the boss to be secured to the actuating assembly 22 by means of thumbscrew 102 or to another extension 150 by means of a tongue 208 on a thumbscrew 206.

The opposite end of rod 164 is attached to a U-shaped crosshead 176. The rod 164 passes through a hole 180 (see FIG. 10) in web 178 after which it is secured by a U-shaped clip 182 which engages a groove 184 in the end of rod 164. The clip 182 is locked against the inner surface of web 178 by means of staked corners 186 on sides 188.

After thus assembling the crosshead 176 to the rod 164, a square boss 162, which is formed on thimble 156, is pressed into a crosshead guide assembly 192 to which the thimble 156 is then welded. The crosshead guide 192 consists of a short channel member 194, the open side of which is closed by a block 196 which can be either welded in place or secured by rivets 198. The side members of channel 194 are slotted at 200. These slots overlie an aperture 190 in crosshead sidelegs 188.

It can now be noted in FIG. 9 and especially FIG. 10 that either the head 124 of cutter assembly 24 or head 166 of extension 150 may be coupled to crosshead 176 within crosshead guide 192 by means of the pin 202. The length of stroke for rod 164 is determined by slot 200 and also, as noted in FIG. 10, by the distance between the outer or rear face of web 178 and the forward face of boss 162.

Quite frequently, it become necessary, or at least more convenient, to shear a sheet of metal with the shears device 20 held beneath the sheet. Cutter assembly 124, illustrated in the previously mentioned figures, is capable of thus being used. However, it would be rather difficult to follow a guide line scribed on the upper sheet surface because punch 120 would not be visible.

This objection is overcome by a modified cutter assembly 300 which is illustrated in FIG. 12. Those elements of assembly 300 which couple it to the actuating assembly 22 are exactly like those of cutter assembly 124. The primary difference in the exposed details, visible in FIG. 12, lies in the reversal of the cutting elements, i.e., the punch and the die.

The cutter assembly 300 comprises a generally U-shaped guide block 302 whose open side is closed by a bar 304 securely fixed in place by welding or rivets 306. The exposed end of the guide block 302 is ground at 308 to serve as the female die. The web of guide block 302 is slotted at 310 so as to allow the escape of cuttings.

Arranged for reciprocal movement within the guide block 302, is a rod 312 on which there is formed the male punch 314. Directly below the punch 314, the rod 312 is provided with a short cylindrical portion 316 so as to allow the tool to make sharp angular turns while cutting a slot.

Directly above the punch 314, rod 312 is fashioned with a short cylindrical boss 320 and with a longer greatly reduced diameter stem 322. A U-shaped clip 318, whose web is apertured to receive stem 322, straddles punch 314 and is firmly biased toward the boss 320 by a coil spring 324. The spring 324 is secured against escape by a snap ring 326.

During a shearing operation of material using the shears device 20, the punch 314 may tend to wedge in the slot being cut. As the punch rises for a new cutting stroke, the material being cut will be dislodged by the side legs of clip 318 thereby enabling the cutter 300 to advance within the slot in preparation for the next bite.

FIGS. 13 and 14 illustrate the ability of cutter assembly 300 to perform an ordinarily difficult task, namely, negotiating a sharp corner as when cutting a metal box in two. The reference numeral 330 indicates a box, one of whose sidewalls 332 and top 334 are to be cut apart. FIG. 13 illustrates the shears device 20 at the end of a slot 336 which it has cut. Obviously, the shears device 20 cannot proceed further, nor can it be withdrawn laterally from the slot because of the legs of clip 318.

The shears device 20 needs only to be backed up a short distance after which the operator will grasp the clip 318 and pull it, against spring 324, until its legs are adjacent the cylindrical boss 320. At this point the clip 318 can be rotated 90° to allow the withdrawal and reinsertion of the shears device 20 as shown in FIG. 14. Cutting may now proceed across the top 334. After taking several bites across the top 334, the clip 318 should then be restored to its previous position to insure release of the material being cut, as described above.

Referring now to FIG. 15 wherein there is shown a modified cutter assembly 400. Cutter assembly 400 is quite similar in all respects to cutter assembly 24. In fact, all the reference numerals correspond between the two assemblies, with the exception only of 400 and 446. For instance, 406 corresponds to 106, 408 to 108 and so on.

The primary difference between the two cutter assemblies 400 and 24 lies in the fact that punch 420 and die 440 are fashioned to take a considerably longer bite. Consequently the cutter 400 is incapable of making sharp turns and is most useful in hastening the operation of making a long straight cut. Punch 420 has depending from its lower surface a tongue 446 whose function it is to prevent chipping of the punch at its inner corners which is where each successive bite starts.

Obviously many modifications and variations of the present invention are possible in the light of the above teachings. It is, therefore, to be understood that within the scope of the appended claims the invention may be practiced otherwise than as specifically described.

What is claimed is:

1. A shears device, comprising, a body structure consisting of a channel having a base and parallel spaced sides, each said side having a corresponding slot positioned intermediate its ends, the forward end of said channel having leading edges arranged transversely to the principal direction of the said slots in said sides of said channel, a channel shaped slide movably mounted in said channel and guided thereby, means for biasing said slide in an extended position, a handle member having one end extending into said channel and having said one end pivotally mounted to said sides of said channel, linking means pivotally connected to said handle member intermediate the ends thereof and to said slide, each side of said slide being provided with a slot one end of which is in juxtaposition with the end of said slot in the respective side of each said channel, a positionable cutting head device having a housing mountable to the respective leading edges of said forward end of said channel, a reciprocating element positioned in said housing and having its opposite ends extending therefrom, pin means at one end of said reciprocating element and slidably positioned by the slots in said channel and slide for mechanically connecting said reciprocating member to said pivotally mounted lever member so as to extend as well as retract said reciprocating member, a first die member secured to the other end of said reciprocating member, and a second mating die member secured to said housing, whereby when a material is positioned between said die members and pressure is applied between said lever member and said channel so as to move said lever member to a position wherein it is substantially parallel to said channel member, said reciprocating member is retracted in said housing to cause said member to shear said material.

2. A shears device as recited in claim 1, and additionally means on said reciprocating member for disengaging the material being cut after the completion of the cutting operation.

3. A shears device as recited in claim 1, and additionally means for locking said lever member and channel member in an inoperative position.

4. A shears device as recited in claim 1, and additionally means for extending said cutting head device from said channel member.

5. A manually operated shears device, comprising, a body structure consisting of a channel having a base and parallel spaced sides, each said side having a first slot positioned intermediate its ends and inclined to the base of said body structure and a second slot arranged substantially parallel to said base of said channel, said slots being arranged to converge to a common point, the forward end of said channel having leading edges arranged transversely to the principal direction of the respective slots in said sides of said channel, a track of channel shape movably mounted in said channel and guided thereby, means for biasing said track in an extended position, a handle member having one end extending into said channel and having said end pivotally mounted to said sides of said channel, linking means pivotally connected to said handle member intermediate the ends thereof and to said movable track, each side of said track channel being provided with a slot whose ends are in juxtaposition with the ends of said slots in the respective side of each channel opposite the converging ends of said slots in said channel, a positionable cutting head device having a housing mountable to the respective leading edges of said forward end of said channel, a reciprocating element positioned in said housing and having its opposite ends extending therefrom, pin means at one end of said reciprocating element and slidably positioned by one pair of the respective pair of slots in said channel and said track for mechanically connecting said reciprocating member to said pivotally mounted lever member so as to extend as well as retract said reciprocating member, a first die member secured to the other end of said reciprocating member, and a second mating die member secured to said housing, whereby when a material is positioned between said die members and pressure is applied between said lever member and said channel so as to move said lever member to a position wherein it is substantially parallel to said channel member, said reciprocating member is retracted in said housing to cause said die member to shear said material.

6. A shears device as recited in claim 5, and additionally means on said reciprocating member for disengaging the material being cut after the completion of the cutting operation.

7. A shears device as recited in claim 5, and additionally means for securing said removable cutting head device in a selected position corresponding to the selected pair of respective slots in said channel member.

8. A shears device as recited in claim 5, and additionally means for locking said lever member and channel member in an inoperative position.

9. A shears device as recited in claim 5, and additionally means for extending said cutting head device from said channel member.

10. A shears device, comprising, a body structure consisting of a channel having a base and parallel spaced sides, each said side having a plurality of converging slots positioned intermediate its ends, the forward end of said channel having leading edges arranged transversely to the principal direction of the respective slots in said sides of said channel, a track of channel shape movably mounted in said channel and guided thereby, means for biasing said track in an extended position, a handle member having one end extending into said channel and having said end pivotally mounted to said sides of said channel, linking means pivotally connected to said handle member intermediate the ends thereof and to said movable track, each side of said track channel being provided with a slot, a positionable cutting head device having a housing mountable to the respective slot as well as respective leading edges of said forward end of said channel, a reciprocating element positioned in said housing and having its opposite ends extending therefrom, pin means at one end of said reciprocating element and slidably positioned by one pair of the respective pair of slots in said channel and said track for mechanically connecting said reciprocating member to said pivotally mounted lever member so as to extend as well as retract said reciprocating member, a first die member secured to the other end of said reciprocating member, and a second mating die member secured to said housing, whereby when a material is positioned between said die members and pressure is applied between said lever member and said channel so as to move said lever member to a position wherein it is substantially parallel to said channel member, said reciprocating member is retracted in said housing to cause said die member to shear said material.

11. A device, comprising, a body structure consisting of a channel having a base and parallel spaced sides, each said side having a plurality of converging slots positioned intermediate its ends, the forward end of said channel having leading edges arranged transversely to the principal direction of the respective slots in said sides of said channel, a track of channel shape movably mounted in said channel and guided thereby, means for biasing said track in an extended position, a handle member having one end extending into said channel and having said end pivotally mounted to said sides of said channel, linking means pivotally connected to said handle member intermediate the ends thereof and to said movable track, each side of said track channel being provided with a slot, a positionable device having a housing mountable to the respective slot as well as respective leading edges of said forward end of said channel, a reciprocating element positioned in said housing and having its opposite ends extending therefrom, and means at one end of said reciprocating element and slidably positioned by one pair of the respective pair of slots in said channel and said track for mechanically connecting said reciprocating member to said pivotally mounted lever member so as to extend as well as retract said reciprocating member, the opposite end of said reciprocating member being coupled to an object to be actuated.

12. A manually operated device, comprising, a body structure consisting of a channel having a base and parallel spaced sides, each said side having a first slot positioned intermediate its ends and inclined to the base of said body structure and a second slot arranged substantially parallel to said base of said channel, said slots being arranged to converge to a common point, the forward end of said channel having leading edges arranged transversely to the principal direction of the respective slots in said sides of said channel, a track of channel shape movably mounted in said channel and guided thereby, means for biasing said track in an extended position, a handle member having one end extending into said channel and having said end pivotally mounted to said sides of said channel, linking means pivotally connected to said handle member intermediate the ends thereof and to said movable track, each side of said track channel being provided with a slot whose ends are in juxtaposition with the ends of said slots in the respective side of each channel opposite the converging ends of said slots in said channel, a positionable device having a housing mountable to the respective leading edges of said forward end of said channel, a reciprocating element positioned in said housing and having its opposite ends extending therefrom, means at one end of said reciprocating element and slidably positioned by one pair of the respective pair of slots in said channel and said track for mechanically connecting said reciprocating member to said pivotally mounted lever member so as to extend as well as retract said reciprocating member, the other end of said reciprocating member being connected to a member to be actuated.

No references cited.